INVENTOR
AUGUST F. LOEBLE

BY

Edelson and Udell
ATTORNEYS

United States Patent Office 3,566,349
Patented Feb. 23, 1971

3,566,349
VEHICLE ANTI-THEFT SYSTEM
August F. Loeble, 800 Woodlawn Ave.,
Collingdale, Pa. 19023
Filed Oct. 25, 1967, Ser. No. 677,982
Int. Cl. B60r 25/04
U.S. Cl. 340—64                                                    9 Claims

ABSTRACT OF THE DISCLOSURE

An auxiliary circuit package addable to the existing electrical circuitry of an internal combustion engine automotive vehicle including a multi-pole relay and arming switch, and optionally including a tear gas bomb and/or engine compartment latch lock, the bomb when used being dischargeable at a selected time into the vehicle driver occupant compartment. When the auxiliary is armed the engine compartment is locked and any attempt to then start the engine without first disarming the auxiliary circuit actuates the relay, thereby grounding the ignition coil primary winding to prevent ignition spark generation, continuously sounding the vehicle horn, and firing the tear gas bomb with or without a time delay. When disarmed the auxiliary circuitry has no effect whatever on the normal vehicle operation.

---

This invention relates to a physically small, simple and inexpensive device for preventing theft of an automotive vehicle by disabling the the motive system of the vehicle. Additionally, an audible alarm is sounded utilizing the warning horn which is a normal part of such vehicles. Optionally provided is a tear gas bomb which may be set to discharge into the vehicle driver location to disable a would-be thief so that he may be readily apprehended. The tear gas bomb may be provided with a time delay mechanism so that it will not immediately discharge when the anti-theft system is triggered inadvertently by the owner of the vehicle by virtue of an oversight in failing to disarm the system. The owner may then quickly disarm the circuit and prevent actuation of the bomb. This does not defeat the system since the vehicle owner will normally be the only person knowing the location of the arming/disarming actuating device.

The auxiliary circuit package for the anti-theft system is installed in the engine compartment and may be made tamperproof by the utilization of a hood latch locking device actuatable by the arming switch to lock the hood and thereby prevent disconnection of the anti-theft system prior to an attempted theft.

Accordingly, it is the object of this invention to provide a vehicle anti-theft system as hereinbefore described, and other objects will become apparent from a reading of the following specification in conjunction with an examination of the appended drawings, wherein.

In the several figures, like elements are denoted by like reference characters.

Figure 1:
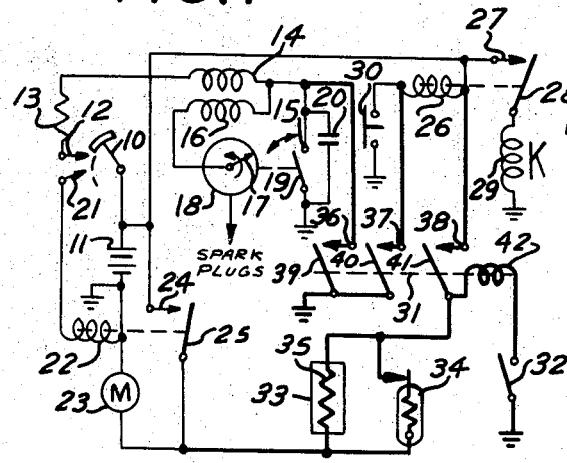
FIG. 1 is a schematic diagram of a portion of the electrical system of an automotive vehicle shown together with the auxiliary electrical circuitry of the vehicle anti-theft system, the auxiliary circuitry being shown in heavier line.

Turning now to the drawings, examine first FIG. 1 which shows in lighter weight line the ignition system and horn portions of the electrical circuitry of an automotive vehicle, and in heavier weight line the additional circuitry which is added to provide the vehicle anti-theft system. In the normal manner, the pole 10 of the ignition switch is connected to the positive terminal of the battery 11 which latter has its negative terminal grounded to the chassis of the vehicle; one contact 12 of the ignition switch is connected through current limiting resistor 13 and ignition coil primary winding 14 to one contact 15 of the distributor breaker points, and through ignition coil secondary winding 16 to the rotor 17 of the distributor 18, the movable breaker point contact 19 being grounded and having the usual capacitor 20 connected across the points; and the ignition switch starting contact 21 is connected to one end of starting motor solenoid 22 with the other end of the coil as well as one side of starting motor 23 being grounded.

Contact 24 of the starter solenoid switch is connected to the positive terminal of battery 11 while the movable contact 25 is connected to the ungrounded end of the starting motor 23 windings. One end of horn solenoid winding 26 connects to the positive terminal of battery 11 and contact 27 of the horn solenoid switch, which latter has its movable contact 28 connected to one end of the horn armature winding 29, the opposite end of the winding being grounded. The end of the horn solenoid winding 26 which is not connected to the battery 11 is returned to ground in the usual manner through the horn ring switch 30.

Figure 6:
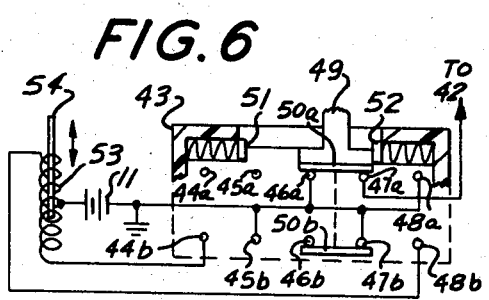
FIG. 6 is a representational showing of a modified form of circuit arming switch which provides automatic operation of a hood locking circuit.

The anti-theft auxiliary system includes the three pole relay 31, the arming switch 32, tear gas bomb 33 and thermal cut-out switch 34. The tear gas bomb 33 and thermal cut-out switch 34 are alternative optional features and one or the other may be dispensed with if desired as will be subsequently explained. Additionally, the engine compartment hood latch lock circuit is shown in FIG. 6 in conjunction with a modified form of arming switch and will be subsequently described.

Relay 31 is provided with three contacts 36, 37 and 38, contact 36 being connected to ignition breaker points contact 15, contact 37 being connected to the horn ring switch end of horn solenoid winding 26, while contact 38 connects to the positive terminal of battery 11. Associated respectively with relay contacts 36, 37 and 38 are normally open relay poles 39, 40 and 41, poles 39 and 40 being connected together and grounded while pole 41 connects to one end of the winding 42 of relay 31 and also to one end of thermal cut-out switch 34 and one end of igniter element 35 of tear gas bomb 33. The opposite end of thermal cut-out switch 34 and igniter element 35 are connected together and commonly to starter solenoid switch contact 25. The opposite end of relay winding 42 is connected to the open contact of arming switch 32.

Tear gas bomb 33 is of the electrically actuated type having an igniter element 35 which when subjected to a suitable current flow therethrough becomes very hot and ignites the chemical composition which generates the tear gas. The igniter is characterized by an irreversible action in that once the ignition cycle has been started it cannot thereafter be terminated and the igniter element is self-destructive by thermal burn-out. Typically, this tear gas bomb device could be a model EACS–1 made by Pyrodynamics, Inc. of Atglen, Pa. The thermal cut-out switch 34 can be the grasshopper type resettable fuse switch including a bi-metal as the movable contact which when subjected to a predetermined current flow heats up to a point sufficient to open the circuit, the spring action built into the movable contact carrying the latter away from the fixed contact so that termination of the heating current flow therethrough does not re-establish the switch in a closed state. The thermal cut-out switch can be made to operate substantially instantaneously or after a delay time as desired. For the instant application, a delay time of up to approximately ten seconds may be desirable.

Figure 2:
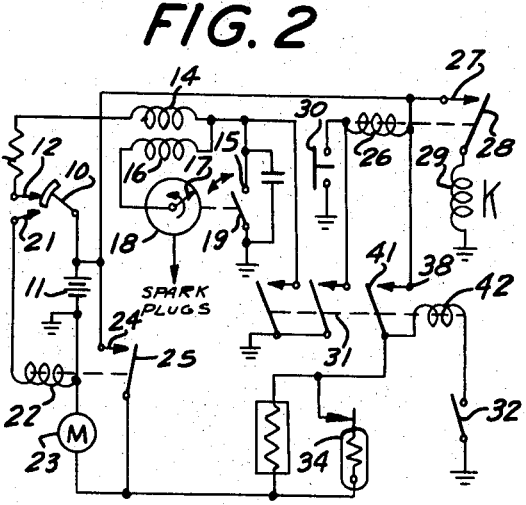
FIGS. 2 and 3 are schematic diagrams as in FIG. 1 illustrating the current flow conditions with the anti-theft system disabled and with the ignition switch successively advanced into an ignition-on condition and motor starting condition.
Figure 3:
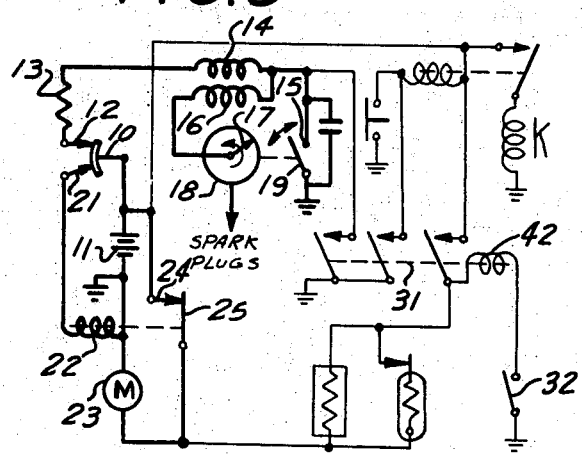

FIG. 1 illustrates the circuit with the ignition switch in its completely open condition as when the ignition is turned off, and with the arming switch 32 in its open state. FIGS. 2 and 3 illustrate the normal functioning of the automobile ignition system when the arming circuit remains in its open state, in the following way.

As shown in FIG. 2, the ignition switch pole 10 has been moved from the off position into contact with ignition switch fixed contact 12 so that the battery 11 is connected through resistor 13 and ignition coil primary winding 14 to the breaker point contact 15. No current will flow through the ignition coil primary 14 if the breaker points are not closed, and this will be the usual case, so that no high voltage will be developed across the ignition coil secondary winding 16 for transmission to the rotor 17 of the distributor 18. Even if the breaker points had been closed, only a single high voltage pulse could be transmitted through the distributor to one spark plug, and ignition will not occur because the fuel conditions in the cylinder are not proper due to lack of compression. Since the circuit from the battery 11 to the starting solenoid 22 is open, the starting motor 23 is not energized nor is it possible for current to flow from the battery over toward the auxiliary electrical circuit. The horn could of course be operated if desired by merely closing the horn ring switch 30 to pull current through horn solenoid winding 26 to close switch contacts 27 and 28 and permit current flow through horn armature winding 29 and thereby sound the horn.

FIG. 3 shows the condition where the ignition switch pole 10 has been further advanced into the starting position so that it now contacts both of the fixed contacts 12 and 21 of the ignition switch to not only permit current flow through the ignition coil primary winding 14 and the breaker points 15 and 19 when the latter are in contact, but also to permit current flow from the battery 11 through the starter solenoid coil 22 to thereby pull into engagement the fixed and movable starter solenoid switch contacts 24 and 25 so that the starting motor 23 is energized from the battery and turns the crank shaft to drive the engine pistons and open and close the ignition breaker points 15 and 19. Ignition of course then occurs in the normal fashion, but it will be observed that the auxiliary circuit remains completely de-energized because arming switch 32 is open, thereby preventing current flow through the winding 42 of relay 31.

Figure 4:
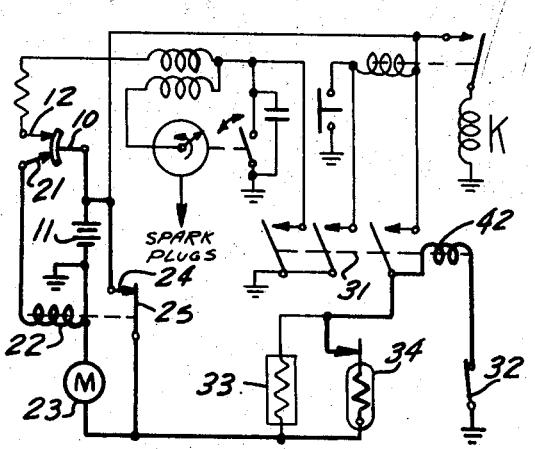
FIG. 4 is a schematic diagram similar to that shown in FIG. 3 excepting that the anti-theft system is in an armed condition.

FIG. 4 illustrates the same circuit conditions as shown in FIG. 3 with one exception, the exception being that prior to operation of the ignition switch, the arming switch 32 has been closed as shown. With the arming switch 32 closed and the ignition off as shown in FIG. 1, it will be apparent that nothing would occur since the coil 42 of relay 31 cannot be energized from the battery 11 since all possible current conduction paths therefrom are in an open-circuit state. Similarly, an examination of FIG. 2 in which the pole 10 of the ignition switch has been engaged with the fixed contact 12 shows identically the same electrical conditions insofar as the winding 42 of relay 31 is concerned. When however, as shown in FIG. 4, the ignition switch pole 10 is moved into the engine starting position by bringing it into engagement with fixed contact 21, the circuit conditions are altered drastically.

Figure 5:
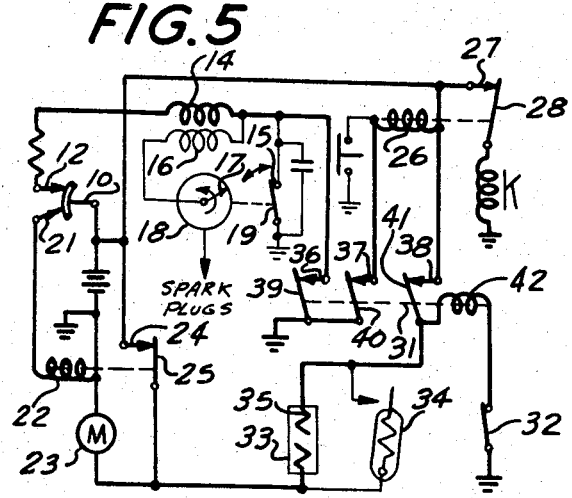
FIG. 5 is similar to FIG. 4 but shows conditions at a time subsequent to that shown in FIG. 4.

FIG. 4 shows the circuit conditions immediately after battery current has been applied to starter solenoid 22 to close the starter solenoid switch contacts 24 and 25 to apply battery voltage to the starting motor 23. At this same instant current is also provided from the battery 11 through starter solenoid contacts 24 and 25 to winding 42 of relay 31 through the closed arming switch 32 and thermal cut-out switch 34. The energization of relay winding 42 within a matter of milliseconds, and before the starting motor 23 can drive the crank shaft to cause ignition, pulls the relay poles 39, 40 and 41 into engagement with their respective contacts 36, 37 and 38, as shown in FIG. 5.

The closure of pole 39 to contact 36 short-circuits the ignition breaker point 15 to ground to thereby draw a fixed current through the ignition coil primary winding 14 regardless of the opening and closing of the breaker points 19 and 15. Consequently, although the starting motor 23 may be energized and turning the crank shaft, nevertheless, no high voltage pulses are developed by the ignition coil secondary winding 16 and the spark plugs of the engine are therefore prevented from firing, thereby completely disabling the engine.

A holding current circuit is established for winding 42 of relay 31 through the now closed pole 41 and contact 38 of the relay so that even if the ignition were turned off completely to thereby open the starter solenoid contacts 24 and 25, nevertheless, relay winding 42 would remain energized and the relay poles would remain in engagement with their associated contacts. Similarly, current flow would be maintained from the battery through the relay pole 41 and contact 38 through the thermal cut-out switch 34 and the starting motor 23 back to the battery ground. The current flow through the thermal cut-out switch 34 is of course completely ineffective to turn over the starting motor 23 but is all that is required to cause the thermal cut-out switch 34 to open up after the preset time delay and thereby apply the battery voltage to the igniter element 35 of the tear gas bomb 33.

The igniter element will of course, as previously described, ignite the tear gas charge and then burn itself open to thereby remove the drain on the battery 11 which would otherwise be imposed by the substantial short-circuit of the starting motor winding. Should no time delay be desired for discharge of the tear gas bomb 33, the thermal cut-out switch 34 may be eliminated from the circuit so that battery voltage will be immediately applied to the tear gas bomb and cause substantially no delay in discharge. Alternatively, if it is not desired to use a tear gas bomb 33 then the thermal cut-out switch or an equivalent fuse element is required so that the relay winding 42 may be energized upon closure of the starter solenoid switch, and so that the substantial load imposed by the starting motor 23 may be removed from the battery 11 after the relay holding circuit is established through pole 41 and contact 38.

The closure of pole 40 and contact 37 of relay 31 also established current flow from the battery 11 through horn solenoid winding 26 to ground to thereby close the pole 28 and contact 27 of the horn solenoid switch to thereby energize the horn armature winding 29 and sound the horn continuously. It will be observed from the circuit conditions of FIG. 5 that once relay 31 has pulled in the vehicle power plant is disabled, an audible alarm is sounded, and optionally the driver compartment of the vehicle is flooded with tear gas. This same result will occur even if an ignition key is not used, but if the ignition system is jumpered from the driver compartment. When this anti-theft system is used in conjunction with a latch lock device, it is apparent that a potential thief cannot gain access to the engine compartment for purposes of disabling the system. A latch lock system actuated by a modified form of arming switch is illustrated in the showing of FIG. 6 to which attention should now be directed.

A modified form of arming switch is shown in FIG. 6 and designated generally as 43, this switch being of the well-known two-circuit four-position slide switch type in which a pair of adjacent contacts are connected together for each of the four positions of the slider. In the showing of FIG. 6, the contacts are designated for the upper circuit as 44a through 48a and for the lower circuit as 44b through 48b. The contact shorting bars which are shiftable together by the operating button 49 are designated for the upper and lower circuits respectively as 50a and 50b.

Additionally incorporated into the switch 43 are a pair of spring elements 51 and 52 disposed at opposite ends of the switch for engagement by the operating button 49 when the latter is pushed to the extreme end positions to connect together either the contact sets 44 and 45 or the contact sets 47 and 48. At such time, the respective spring 51 or 52 is compressed so that when holding pressure on the operating button 49 is released, the spring engaged therewith shifts the operating button backward to the next circuit position. That is, into a position where the shorting bars 50a and 50b are connecting together either their respectively associated contacts 45 and 46 or contacts 46 and 47, depending upon which of the springs 51 and 52 is effecting the restoring movement.

As shown, switch contacts 45b, 46a, 47b and 48a are connected together and grounded, contact 47a is connected to the end of relay winding 42 as illustrated in FIGS. 1 through 5, and contacts 44b and 48b are respectively connected to opposite ends of a center-tapped solenoid winding 53, the center-tap of which is connected to the positive terminal of the automotive vehicle battery 11. The solenoid plunger 54 is shiftable in opposite directions within the solenoid winding 53 by energization of different ones of the half-winding sections. The plunger 54 is used in a deadman arrangement to lock or unlock the already existing hood latch of the automotive vehicle by shifting of the plunger in one direction to effect locking and in the opposite direction to effect unlocking.

As shown in FIG. 6, the solenoid plunger 54 has been shifted to a hood locking position and the relay winding 42 is in an armed condition by establishment of the circuit to ground through the switch contacts 46a and 47a and shorting bar 50a connecting the latter together. When the arming button 49 was moved into the circuit arming position, it was first pushed to its limit of travel in the right hand direction so that shorting bar 50b closed the circuit between switch contacts 47b and 48b to thereby apply battery current to the upper half of the solenoid winding 53 to shift the plunger 54 in that direction and lock the hood mechanism.

When it is desired to disarm the circuit, the operating button 49 is shifted to the extreme left against the return biasing action of spring 51 so that shorting bar 50b then connects together switch contacts 44b and 45b to thereby energize the lower half of solenoid winding 53 from the battery 11 and retract the plunger 54 to unlock the hood latch, the spring 51 of course thereafter shifting the shorting bar 50b to the open-circuit condition where the latter connects together contacts 45b and 46b. Simultaneously, of course, shorting bar 50a connects together open contact 45a with contact 46a. Consequently, the auxiliary circuit is disarmed. The biasing action of springs 51 and 52 is effective in each case to interrupt the current flow from the battery to the solenoid winding 53 after the solenoid plunger 54 has been moved to its desired position, and thereby to prevent a constant current drain on the battery 11.

Having now described my invention in connection with a particularly illustrated embodiment thereof, modifications and variations of my invention may now occur from time to time to those persons normally skilled in the art without departing from the essential scope or spirit of my invention, and accordingly it is intended to claim the same broadly as well as specifically as indicated by the appended claims.

What is claimed to be new and useful is:

1. An auxiliary electrical circuit package connectable to the existing electrical circuitry of an automotive vehicle having a battery and an internal combustion engine of the type characterized by ignition of fuel vapors by means of an electrical discharge from an electrical discharge device, comprising in combination, control means connectable to the ignition system of the internal combustion engine and effective only when actuated to prevent fuel ignition by preventing the required electrical discharge from the electrical discharge device, selectively operable actuating means operatively coupled to said control means effective when operated to actuate and deactuate said control means as desired, and an electrically actuatable tear gas bomb having an actuation circuit coupled to and actuatable by the battery through said control means when the latter is actuated, and decoupled from the battery when said control means is deactuated.

2. The combination as described in claim 1 further including time delay means in electric circuit with the said actuation circuit of said tear gas bomb effective to delay for a predetermined time interval the actuation of said bomb.

3. The combination as described in claim 1 further including locking means effective when actuated in a first way to lock the vehicle engine compartment from the inside thereof so that the compartment cannot be opened from the outside and effective when actuated in a second way to unlock the engine compartment, and selectively operable locking means actuating means external to said compartment operatively coupled to said locking means effective when operated to actuate said locking means selectively in said first and second ways, said last named means being coupled to and operable simultaneously with said control means selectively operable actuating means so that the vehicle engine compartment may be locked when said control means is actuated to prevent fuel ignition and may be unlocked when said control means is deactuated to restore normal vehicle operation.

4. The combination as described in claim 1 wherein the internal combustion engine includes an ignition coil having primary and secondary windings and means for causing current bursts through the primary winding to generate potential at the secondary winding normally sufficient to cause the aforesaid electrical discharge from the electrical discharge device, and wherein said circuit package control means when actuated causes a continuous saturating current to flow through the ignition coil primary and thereby suppresses the generation of discharge potential at the secondary winding.

5. The combination as described in claim 1 wherein the automotive vehicle is provided with an electrically operable horn, in an electrical circuit with the battery for operating the horn, and wherein said control means includes means couplable to the electric circuit of the electrically operable horn effective when actuated to condition the horn to automatically sound whenever an attempt is made to start the internal combustion engine, said last named means being selectively actuated and deactuated as aforesaid by said selectively operable actuating means coupled to said control means.

6. The combination as described in claim 2 wherein said time delay means comprises a thermal cut-out switch connected in parallel with and providing an electrical short-circuit by-passing the said actuation circuit of said tear gas bomb, the short-circuit being removed by opening of said thermal cut-out switch after said predetermined time interval.

7. The combination as described in claim 4 further including time delay means in electric circuit with the said actuation circuit of said tear gas bomb effective to delay for a predetermined time interval the actuation of said bomb, wherein the automotive vehicle is provided with an electrically operable horn in an electric circuit with the battery for operating the horn, said control means including means couplable to the electric circuit of the electrically operable horn effective when actuated to condition the horn to automatically sound whenever an attempt is made to start the internal combustion engine, said last named means being selectively actuated means coupled to said control means, said means for causing current burst through the ignition coil primary winding is a breaker point system having one point connected to the primary winding and the other point at battery return potential, and wherein said control means comprises a switch electrically connectable across the breaker points, said switch being open and closed respectively when said control means is deactuated and actuated respectively, wherein said internal combustion engine is cranked by an electric starting motor energized from the battery, and wherein said control means couplable to the electric circuit of the horn comprises switch means which when closed complete the electric operating circuit of the horn to the battery when the battery is connected to the starting motor.

8. The combination as described in claim 7 wherein said time delay means comprises a thermal cut-out switch connected in parallel with and providing an electrical short-circuit bypassing the said actuation circuit of said tear gas bomb, the short-circuit being removed by opening of said thermal cut-out switch after said predetermined time interval.

9. The combination as described in claim 8 further including locking means effective when actuated in a first way to lock the vehicle engine compartment from the inside thereof so that the compartment cannot be opened from the outside and effective when actuated in a second way to unlock the engine compartment, and selectively operable locking means actuating means external to said compartment operatively coupled to said locking means effective when operated to actuate said locking means selectively in said first and second ways.

References Cited

UNITED STATES PATENTS

| | | | |
|---|---|---|---|
| 2,820,149 | 1/1958 | Roth | 307—10UX |
| 2,882,987 | 4/1959 | McDougal, Sr. et al. | 180—114 |
| 3,158,749 | 11/1964 | McAllister | 307—10UX |
| 3,194,970 | 7/1965 | Claps | 340—64X |
| 3,242,460 | 3/1966 | Morrell | 340—63X |
| 3,439,771 | 4/1969 | Commins | 307—10X |
| 3,464,060 | 8/1969 | Arditti | 340—64 |

ALVIN H. WARING, Primary Examiner

U.S. Cl. X.R.

307—10; 180—114